(12) United States Patent
Øhrn

(10) Patent No.: US 12,488,198 B2
(45) Date of Patent: Dec. 2, 2025

(54) SYSTEM AND METHOD OF PROVIDING CONTEXT-AWARE AUTHORING ASSISTANCE

(71) Applicant: Microsoft Technology Licensing, LLC, Redmond, WA (US)

(72) Inventor: Aleksander Øhrn, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 339 days.

(21) Appl. No.: 18/328,475

(22) Filed: Jun. 2, 2023

(65) Prior Publication Data
US 2024/0403568 A1 Dec. 5, 2024

(51) Int. Cl.
*G06F 40/40* (2020.01)
*G06F 16/3332* (2025.01)

(52) U.S. Cl.
CPC .......... *G06F 40/40* (2020.01); *G06F 16/3334* (2019.01)

(58) Field of Classification Search
CPC .............................. G06F 40/40; G06F 16/3334
See application file for complete search history.

(56) References Cited

U.S. PATENT DOCUMENTS

| | | |
|---|---|---|
| 2004/0093328 A1 | 5/2004 | Damle |
| 2015/0381664 A1 | 12/2015 | Bruno et al. |
| 2016/0343056 A1 | 11/2016 | Hu et al. |
| 2018/0174165 A1 | 6/2018 | Renz et al. |

(Continued)

FOREIGN PATENT DOCUMENTS

| | | |
|---|---|---|
| JP | 2022125096 A | 8/2022 |
| WO | 2013098830 A1 | 7/2013 |

OTHER PUBLICATIONS

"AI Chatbot to Improve Enterprise CX with Personalized, and Automated Conversations", Retrieved From: https://www.ameyo.com/product/conversational-ai/chatbot/, Retrieved on Apr. 13, 2023, 8 Pages.

(Continued)

*Primary Examiner* — Sonia L Gay
(74) *Attorney, Agent, or Firm* — NovoTechIP International PLLC

(57) ABSTRACT

A system and method for automatically generating content for a user based on a context includes conducting a search of data associated with the user to generate search results associated with the user, applying first models to the first search results to infer characteristics and patterns associated with the user and to generate a first set of content based on the inferred characteristics and patterns, and generating a first pseudo-document that includes a first set of pattern content, based on the first set of content generated by the one or more first models. Additionally, second models are applied to data associated with the context to infer characteristics and patterns associated with the context and to generate a second set of content based on the inferred characteristics and patterns of the context. A second pseudo-document is generated based on the second set of content. A prompt is created by integrating the first pseudo-document and the second pseudo-document and transmitted to a language model to cause the language model to generate content for the user that is customized to both the user and the context.

20 Claims, 10 Drawing Sheets

(56) References Cited

U.S. PATENT DOCUMENTS

| | | |
|---|---|---|
| 2019/0205726 A1 | 7/2019 | Khabiri et al. |
| 2020/0194121 A1 | 6/2020 | Kupershmidt et al. |
| 2021/0042075 A1 | 2/2021 | Viedt |
| 2021/0142808 A1 | 5/2021 | Jones et al. |
| 2022/0163950 A1 | 5/2022 | Dipert et al. |
| 2022/0188361 A1 | 6/2022 | Botros et al. |
| 2022/0229832 A1 | 7/2022 | Li et al. |
| 2023/0005070 A1 | 1/2023 | Nguyen et al. |
| 2023/0084120 A1 | 3/2023 | Prosad et al. |
| 2024/0320424 A1* | 9/2024 | Gore .................. G06F 40/20 |
| 2024/0403564 A1* | 12/2024 | Bendersky ............. G06N 3/045 |

OTHER PUBLICATIONS

Wiacek, et al., "How to Personalize Your Chatbot Communication", Retrieved From: https://www.chatbot.com/academy/chatbot-designer-free-course/personalization/, Retrieved on Apr. 13, 2023, 17 Pages.

International Search Report and Written Opinion received for PCT Application No. PCT/US2024/030667, Jul. 31, 2024, 13 pages.

Salemi, et al., "LaMP: When Large Language Models Meet Personalization", arxiv.org, Cornell University Library, 201 Olin Library Cornell University, Ithaca, Apr. 22, 2023, pp. 1-16.

* cited by examiner

SYSTEM AND METHOD OF PROVIDING CONTEXT-AWARE AUTHORING ASSISTANCE

BACKGROUND

Recently, there has been a significant increase in the use of machine-learning (ML) models such as large language models (LLM) to provide a variety of services and functions. Many LLMs receive an input such as a text segment and provide a prediction based on the input. The input to these types of language models is often received from a user and the language model relies on its training to provide predictions based on the input and its learned knowledge. While language models are able to provide valuable information in this manner, the output provided is often based on generalized knowledge and not specific to the user who provided the query or a specific context or audience for which the output is provided. Thus, a user that requests the language model to write about a specific topic will receive a generalized response. The response would likely be the same if a different user were to provide the same query as an input to the language model and/or if the intended recipient or context of the query is different. While this can be useful in many situations, it is not always ideal for users who require a more customized experience. Yet, training a language model such as an LLM to provide customized responses to individual users is a very resource-extensive endeavor and thus impractical.

Hence, there is a need for improved systems and methods of providing context-aware authoring assistance via use of language models.

SUMMARY

In one general aspect, the instant disclosure presents a data processing system having a processor and a memory in communication with the processor wherein the memory stores executable instructions that, when executed by the processor, cause the data processing system to perform multiple functions. The functions receiving a user query submitted by a user via a user interface element of an application, the user query including a context; constructing a search query based on the user query; applying the search query to data associated with the user to generate first search results associated with the user; applying one or more first models to the first search results to conduct analysis of the data associated with the user and to generate a first set of content associated with the user; generating a first pseudo-document by including at least a portion of the first set of content generated by the one or more first models; applying one or more second models to data associated with the context to conduct analysis of the data associated with the context and to generate a second set of content associated with the context; generating a second pseudo-document by including at least a portion of the second set of content generated by the one or more second models; creating a prompt, using a prompt generating engine, by integrating the user query with the first pseudo-document and the second pseudo-document; and transmitting the generated prompt to a language model to cause the language model to generate a response to the user query that is customized to both the user and the context.

In yet another general aspect, the instant disclosure presents a method for automatically generating content for a user based on a context. In some implementations, the method includes conducting a search of data associated with the user to generate first search results associated with the user; applying one or more first models to the first search results to infer first patterns associated with the user and to generate a first set of content based on the inferred patterns; generating a first pseudo-document that includes a first set of pattern content, based on the first set of content generated by the one or more first models; applying one or more second models to data associated with the context to infer second patterns associated with the context and to generate a second set of content based on the second inferred patterns; generating a second pseudo-document based on the second set of content generated by the one or more second models; creating a prompt, using a prompt generating engine, by integrating the first pseudo-document and the second pseudo-document; and transmitting the generated prompt to a language model to cause the language model to generate the content for the user, the content being customized to both the user and the context.

In a further general aspect, the instant application describes a non-transitory computer readable medium on which are stored instructions that when executed cause a programmable device to perform functions of processing a user query submitted by a user, the user query including one or more terms and a context; constructing a search query based on the one or more terms and at least one of the user and the context; applying the search query to at least one of data associated with the user and data associated with the context to generate search results associated with the one or more terms and at least one of the user and the context; providing search results associated with the one or more terms and the user to one or more first models to generate a first set of content associated with the user; receiving the first set of content from the one or more first models; providing search results associated with the one or more terms and the context to one or more second models to generate a second set of content associated with the context; receiving the second set of content from the one or more second models; automatically extracting data from the first set of content associated with the user and the second set of content associated with the context to generate a pseudo-document; creating a prompt, using a prompt generating engine, by integrating the user query with the pseudo-document; and transmitting the generated prompt to a language model to cause the language model to generate a response to the user query that is customized to both the user and the context.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
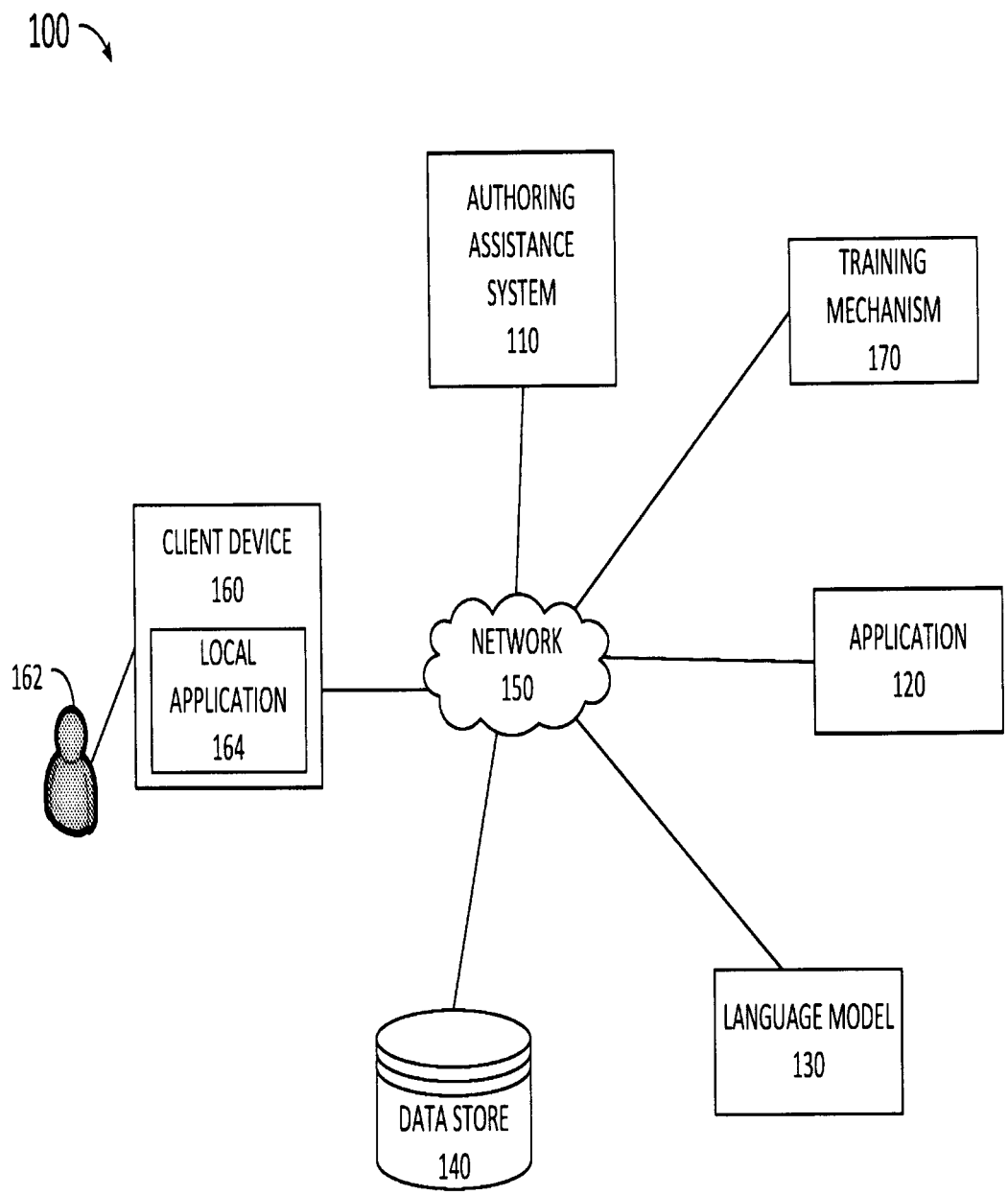
FIG. 1 depicts an example system upon which aspects of this disclosure may be implemented.

Artificial intelligence (AI) models can be used to recognize, summarize, translate, predict and/or generate content based on knowledge gained from training datasets. A language model is a machine learning (ML) model that is trained using large amounts of language data to recognize, summarize, translate, predict and/or generate text and other content. Language models include statistical models (e.g., n-gram models) and/or deep neural models (e.g., neural language models). In an example, a language model comprises a large language model (LLM) which is a language model trained on very large datasets of trianing data. Because LLMs are trained on very large datsets of data, they are often very accurate and efficient in providing relevant outputs. Examples of LLMs include, but are not limited to, generative models, such as Generative Pretrained Transformer (GPT)-based models, e.g., GPT-3, GPT-4, ChatCPT, and the like.

Language models can be used in a variety of manners. For example, an LLM such as a ChatGPT chatbot can be used as an authoring assistant or copilot that assists the user in authoring content. In an example, the user can ask the chatbot to write about a specific topic and the chatbot would in response provide a written segment about the topic. While this may be useful in various situations where the user is looking for generalized content, it does not provide the user with a customizable experience where the user can request content to be generated for a specific audience or with the user's preferences and characteristics in mind. That is because a trained language model such as an LLM can often only receive and process a simplistic text prompt. While some AI models exist that customize content based on a user's context, history and the like, those types of models require extensive training, and as such require extensive use of memory, processing and network resources. One of the advantages of using a language model such as an LLM is that it has already been trained and as such does not require extensive computing resources to train and/or use. Yet, as discussed above, an LLM cannot provide customized content for the requesting user or a specific audience. Thus, there exists a technical problem of inability of pretrained language models to generate content that is personalized for the requesting user, or the context associated with the request, without additional training, and thus without incurring significant computing costs.

To address these technical problems and more, in an example, this description provides technical solutions for automatically generating content such as a communication for a requesting user in a specific context based on both the requesting user's and the context's historical behavior and patterns. The specific context may be a specific audience (e.g., a specific person to which the content is directed) or a specific situation (e.g., for use in a meeting). This involves applying a model for pre-analysis of the user's historical data such as communications (e.g., emails, messages, documents, comments, and the like) and creating a set of patterns of content in a first pseudo-document. The technical solution also includes applying a model for pre-analysis of the context's historical behavior and patterns. When the context is a specific event or meeting, a model is applied to create a set of contextual content such as information about attendees, topics, location, and the like in a second pseudo-document. When the context is a specific user, a similar analysis as the one performed for the requesting user is applied to analyze the receiver's historical behavior and communications and generate a second pseudo-document that is similar to the first pseudo-document. The first and second pseudo-documents are then used to automatically generate a prompt that includes the request from the user as well as the first and second pseudo-documents for transmission to a language model to achieve a response that is customized for the requesting user and the context.

The technical solutions described herein addresses the technical problem of inefficiency of language models such as LLMs in generating responses that are personalized for a requesting user and/or the context associated with the request. The technical solution utilizes an inexpensive mechanism for retrieving relevant data related to the user's history of communications and/or behavior and generating a pseudo-document based on the retrieved data that can be used in prompt generation. The technical solutions utilizes a similar efficient mechanism to retrieve relevant data related to the context associated with the request and generates another pseudo-document based on the retrieved data for use in prompt generation. The two pseudo-documents are then used to automatically generate a properly formatted prompt for submission to the language model. The prompt contains targeted information about the user and the context and as such enables the language model to provide a personalized response. In this manner, personalized authoring assistance can be provided by an already trained language model without the need for additional training and without a need for extensive use of computing resources. The technical effects include at least (1) improving the accuracy, relevancy and completeness of responses provided by a language model to user requests for content generation by enabling the language model to provide responses that are personalized for the requesting user and/or for the context associated with the request; and (2) enabling personalized content creation by a language model without the need for additional training.

FIG. 1 illustrates an example system 100, upon which aspects of this disclosure may be implemented. The system 100 includes an authoring assistance system 110, an application 120, a language model 130, a data store 140, a training mechanism 170, and a client devices 160. Each of the authoring assistance system 110, application 120, language model 130, data store 140, and training mechanism 170 may be stored on and/or executed by one or more servers that work together to deliver the functions and services provided by each service or application included in the servers.

The application 120 is an online computer program executed on a server (not shown) to provide application functionalities via an online service. The application 120 communicates via the network 150 with a user agent (not shown), such as a browser, executing on the client device 160. The user agent may provide a UI that allows the user to interact with the application 120. The application 120 and local applications 164 may be any application that enables a user such as user 162 to interact with the application to submit a request for authoring assistance. In an example, the application 120/164 is an application that provides a copilot for authoring assistance. The application 120 is a web application, while the local application 164 is a native application that is executed on the client device 160. Examples of suitable applications include, but are not limited to, a communications application (e.g., Microsoft® Outlook or Teams®), presentation application, design application, word processing application, social media application, notes application and any other application in which a user may require authoring content. In some implementations, the application 120 and/or local application 164 is an application that simply provides authoring assistance. For example, application 120 may be an application that is configured to receive user requests for authoring assistance which the user can use in a variety of documents and/or applications.

The network 150 is a wired or wireless network(s) or a combination of wired and wireless networks that connect one or more elements of the system 100. The client device 160 is a personal or handheld computing device having or being connected to input/output elements that enable the user 162 to interact with various applications such as the online application 120 and local application 164. Examples of suitable client devices 160 include but are not limited to personal computers, desktop computers, laptop computers, mobile telephones, smart phones, tablets, phablets, smart watches, wearable computers, gaming devices/computers, televisions, and the like. The client device 160 is representative of a client device used to access and utilize an authoring assistance service. While only one client device is shown in FIG. 1, a computing environment may have many different client devices that can access the authoring assistance system 110. The internal hardware structure of a client device and/or a server on which one of the authoring assistance system 110 or language model 130 is executed is discussed in greater detail with respect to FIGS. 6 and 7.

To enable users to efficiently receive responses to authoring requests, the application 120 and/or application 164 provides a user interface element for users to submit authoring requests. The requests are transmitted from the application 120 and/or application 164 to the authoring assistance system 110 for examination, preprocessing and prompt generation, before, the prompt is transmitted to the language model 130 for processing. The language 130 is a language model which may be a deep learning algorithm that can recognize, summarize, translate, predict and/or generate text and other content based on knowledge gained from large training datasets. Examples of language models include, but are not limited to, generative models, such as GPT-based models, e.g., GPT-3, GPT-4, ChatGPT, and the like. The application 120 and/or application 164 may utilize the language model 130 to provide responses to user authoring assistance requests.

The authoring assistance system 110 receives or intercepts a user request from the application 120 and/or local application 164 and performs preprocessing on the user request to generate a prompt that is personalized for the requesting user and/or context of the request. To achieve this, the authoring assistance system 110 may utilize one or more trained ML models to retrieve or infer user history and/or behavioral data and/or data about the context. In some implementations, at least some user behavioral data, characteristics, and/or patterns are precomputed using the trained ML models. For example, some user characteristics such as writing styles and preferences are inferred offline and stored in a data store such as a user profile data store. In this manner, at least some of the inferences do not need to be determined at runtime when a query is received. This increases efficiency as some inferences do not need to occur every time a query is received, thus resulting in decreased use of computing resources and faster query responses.

In some implementations, the authoring assistance system 110 utilizes a prompt generation engine (shown in FIG. 2) to generate a prompt that is likely to result in a personalized responses from the language model 130. Details about elements included in and operations of the authoring assistance system 110 are discussed with respect to FIG. 2. In some implementations, the authoring assistance system 110 or some elements of the authoring assistance system are available locally on the client device 160. The language model 130 processes the prompt and generates a personalized content, which is then transmitted to the application 120/164 for display to the user.

In some implementations, historical data (e.g., communications data or data with respect to user actions in documents) and other data about the context (e.g., data about an intended receipt or situation) is stored in the data store 140. Alternatively, some of the data may be stored locally within the client device 160 or in another client device that is accessible to the authoring assistance system 110. Data about the pseudo-documents created, the prompts generated and/or training data used by the training mechanism 170 may also be stored in the data store 140. The training data is used by the training mechanism 170 in training the models used by the authoring assistance system 110 to provide ongoing and real time training. Thus, the data store 140 functions as a repository in which databases relating to training, user and context history, and prompt generation are stored. Although shown as a single data store, the data store 140 is representative of multiple storage devices and data stores which may be accessible by one or more of the authoring assistance system 110, training mechanism 170, language model 130, and/or client device 160.

Figure 2:
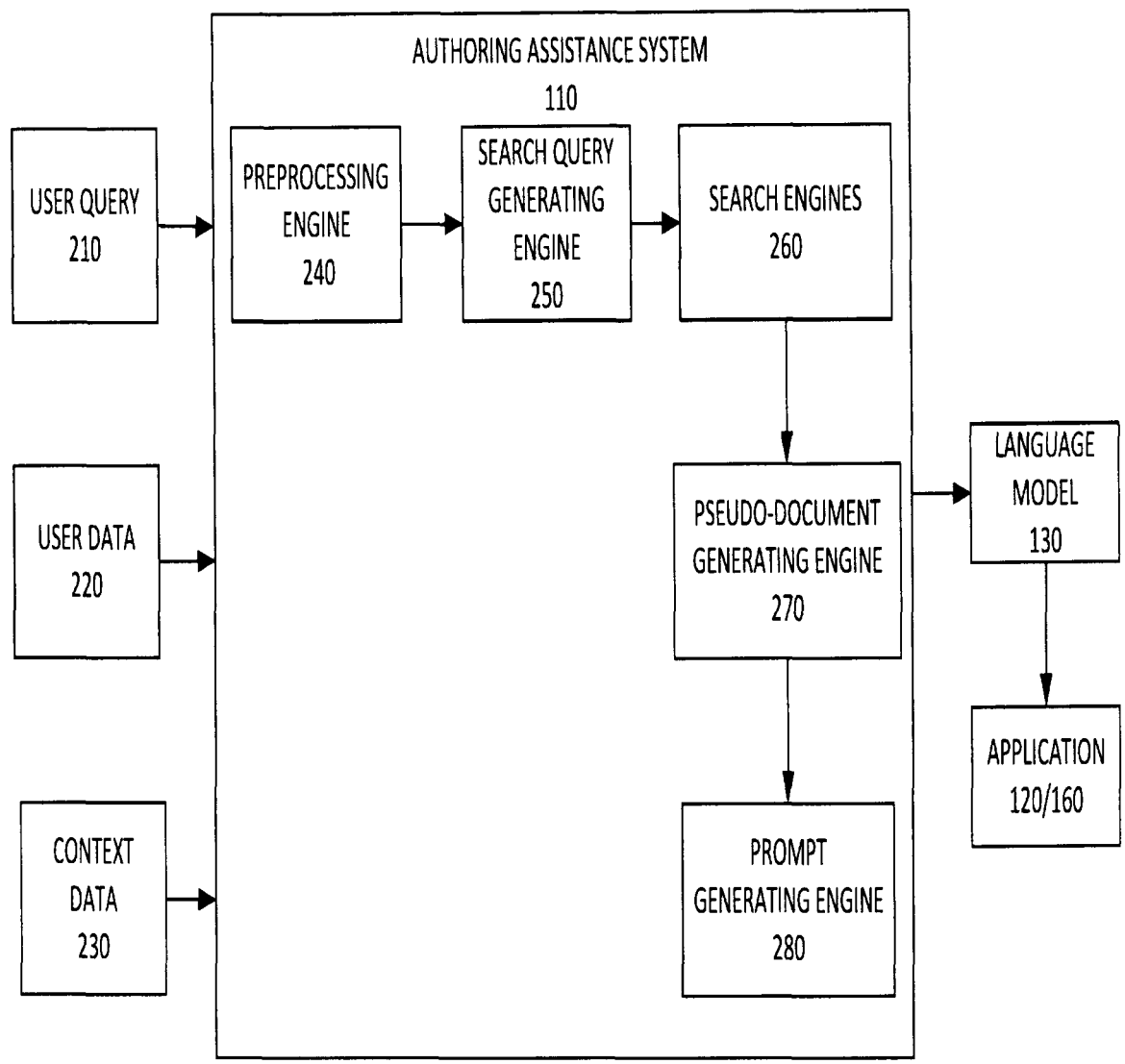
FIG. 2 depicts an example of some elements involved in providing context-aware authoring assistance.

FIG. 2 depicts an example of some elements involved in providing context-aware authoring assistance. Once a user query 210 is received (e.g., via a user interface element of an application), the user query 210 is transmitted to the authoring assistance system 110 for processing. In some implementations, the user query 210 is retrieved by making inference calls to an application programming interface (API) that refers to the language model 130. The user query 210 may be in the form of text, voice or any other format that the authoring assistance system 110 and/or the language model 130 supports. In some implementations, when the user query 210 is in a format not supported by the language model 130, a conversion engine is used to convert the input to a supported format (e.g., voice to text). The conversion engine may be included in the authoring assistance system 110 or may be a separate engine used in combination with the authoring assistance system 110 to provide conversion services. In some implementations, the user query 210 is in a natural language. The user query 210 may be received from a UI of a chatbot or copilot associated with a specific application or may be received from UI of a standalone chatbot.

The authoring assistance system 110 utilizes the preprocessing engine 240 for performing preprocessing operations on the user query 210 before it is utilized for generating a search query. That is because the user query is in a natural language format and as such may not be appropriately formatted or worded for use as a search query. In some implementations, the preprocessing operations involve examining the response for grammar, spelling, formatting and the like. For example, the preprocessing engine 240 may utilize a spellchecker to ensure the words in the user query are spelled correctly, and when misspelled words are detected the preprocessing engine 240 may correct the spelling. Additionally, the preprocessing engine 240 may remove extraneous or unnecessary terms (e.g., stop words) from the user query 210. In some implementations, the preprocessing engine 240 also determines whether or not the user query 210 is relevant to an authoring assistance task. For example, the preprocessing engine 240 may utilize a classifier or natural language processing (NLP) model to determine if the user query is actually related to authoring assistance or whether it is related to a task that cannot be performed by the authoring assistance system 110. When the preprocessing engine 240 determines that the user query 210 is not related to authoring assistance, the authoring assistance system 110 transmits a notification to the application 120/164, which can display a notification to the user that a response to their query cannot be provided. For example, if the user query is "how is the weather today?", the preprocessing engine 240 may determine that this is not related to authoring assistance and may thus notify the application that a response to the query cannot be provided. Alternatively, when the language model is able to provide responses to queries that do not involve authoring assistance, the query may be transmitted directly to the language model without further processing by the authoring assistance system 110.

After preprocessing is performed, the preprocessed query is submitted to the search query generating engine 250 that generates appropriate search queries to one or more search engines 260 for processing. In some implementations, the preprocessing engine 240 and search query generating engine 250 are combined and the preprocessing engine 240 also generates the search queries for the search engines 260. The search queries may include search terms included in the user query 210 and may be worded and/or formatted appropriately based on the dataset on which the search is being performed. For example, for conducting searches on documents, the search query may include the name of the user, while for searches conducted on the user's communications, the user name may not be required (since the communications are already narrowed down to those of the user's).

Figure 3A:
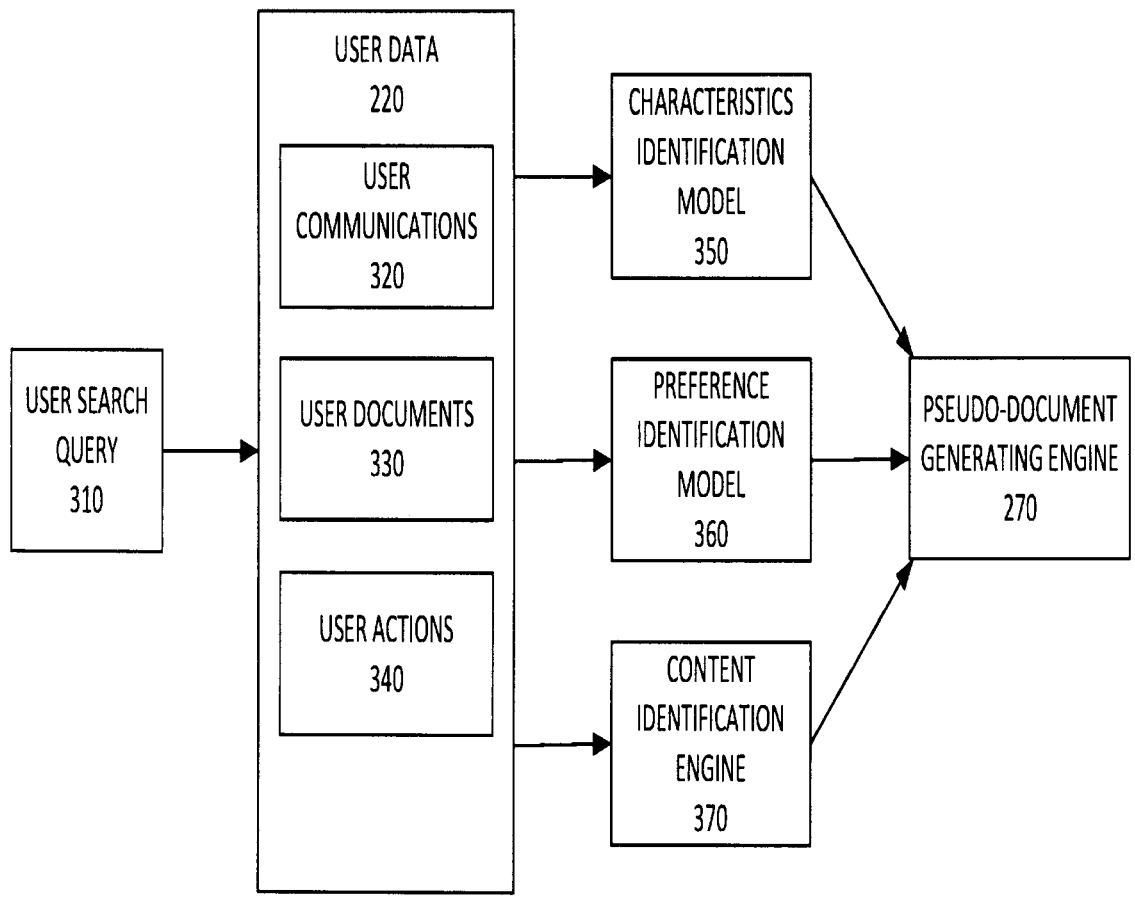
FIGS. 3A-3B depict elements involved in searching for and use of data in generating a prompt for the language model.
Figure 3B:
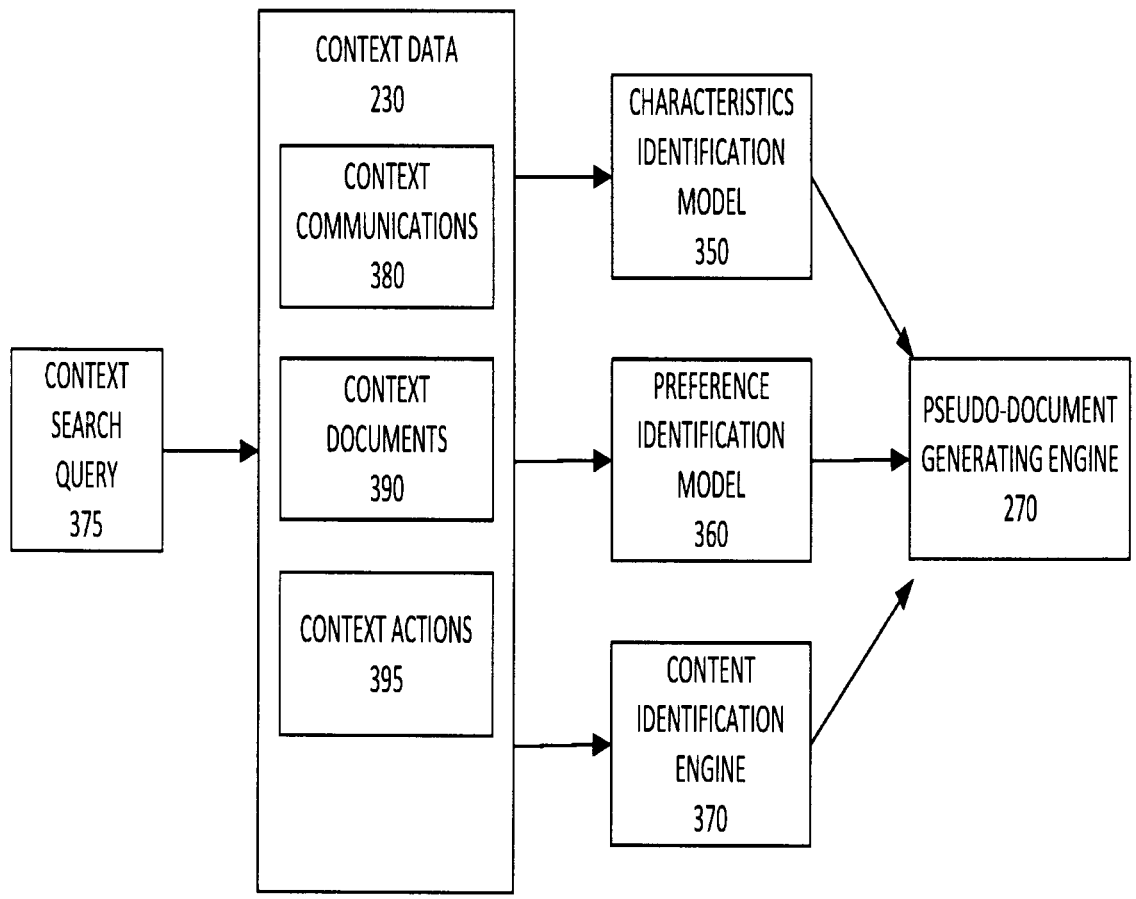

The search engines 260 represent one or more search engines that are configured for executing searches on various types of data. The data may already be indexed and the search engines 260 may be designed for performing searches on the specific type of data. For example, for search of documents, the search engines 260 may represent a search engine that can receive a search query and conduct a search on a list of documents for keywords included in the search query. FIGS. 3A-3B depict elements involved in searching for and use of data in generating a prompt for the language model. FIG. 3A depicts elements involved in processing a search query to identify data associated with the requesting user. To ensure that the data identified as a result of the search is restricted to data associated with the requesting user, user search query 310 may include keywords related to the user. For example, for a user query submitted by user X that states "draft an email to Jennifer Smith about the monthly budget", the user search query 310 may include the terms email, monthly budget, and user X. Alternatively, different user search queries may be generated and used for different data sets. For example, when the data set that is being searched is the requesting user's emails, the user search query may specify that emails sent from user X should be searched for the term "monthly budget". Thus, the search query generating engine 250 may determine which data sets to search based on the user query 210 and subsequently generate an appropriate search query for the selected data set. In some implementations, the search query is converted to embeddings that can then be compared to embeddings of the data sets searched to increase the searching efficiency. For example, one or more embedding vectors that are numeral in form may be computed from one or more portions of the textual user query.

User data 220 may include a variety of data types and/or data sets. In some implementations, user data 220 includes user communications 320, user documents 330 and user actions 340. User communications 320 includes the user's emails, user's instant messages (e.g., user's messages during a virtual meeting, or messages sent via an instant messaging applications), user's text messages and/or any other type of communications the requesting user has exchanged with other users. In some implementations, the user communications 320 includes a subset of the user's communications or the search is limited to a subset of the user's communications. For example, only communications within the last 2 years may be searched. In another example, only the user's emails are searched. The time period and/or type of communications searched may depend on the user query 210. It should be noted that the user data 220 is data for which the user and the authoring assistance system have access permissions. Thus, the authoring assistance system 110 takes permission and access rights into account when searching for data.

User documents 330 include documents that the user has authored and/or the user has performed specific actions on (e.g., the user has reviewed, edited, commented on, saved in a personal folder, attached to an email and the like). Similar to the user communications 320, the user documents 330 may be limited by a time factor. For example, only documents authored, accessed or used in the last year by the user may be included. Furthermore, the type of document searched for may be limited based on the user query 210 and/or the subsequent user search query 310. For example, the search query 310 may specify that only documents authored by the user should be searched.

User actions 340 includes a repository of actions the user has taken with respect to documents or other items of information. For example, user actions 340 may include actions the user has taken with respect to posts on a company needs feed or social media posts (to which the authoring assistance system 110 as access as well as permission to use). The user actions 340 may also include actions the user has taken on documents such as comments the user has made on other users' documents. Additionally, the user actions 340 can include the user's actions in a virtual meeting (e.g., use of emoji on specific content of a meeting) or user's actions on other messages (e.g., use of emoji on an instant message). User actions 340 can also include data about whether or not the user interacted with respect to specific content (e.g., posts, messages, documents). For example, data may be collected on the amount of time the user spends interacting with various posts or instant messages, and this data may be used as user actions 340 for inferring user characteristics or preferences, as discussed in more detail below. Other types of data may be included in the user data 220. In some implementations, the user data 220 is provided to the authoring assistance system 110. In other implementations, the user data 220 is retrieved by or accessed by the authoring assistance system 110, as needed.

Once the user search query 310 is run on the user data 220, the results are provided to the characteristics identification model 350, preferences identification model 360 and/or the content identification engine 370 for further processing. The characteristics identification model 350 identifies characteristics associated with the user. To achieve this, the characteristics identification model 350 receives user communications 320, user documents 330 and/or user actions 340 and examines the data to make inferences about the user. These inferences may relate to the user's writing style, the user's habits (e.g., the user often comments on posts related to marketing or the user often reacts to chat messages during virtual meetings), the user's writing tone, the user's preferred application for writing (e.g., Word processing application, notes application, etc.), and the like. For example, the characteristics identification model 350 may determine based on an examination of the user's documents that the user normally uses short sentences to write. In another example, the characteristics identification model 350 determines that the user often uses a formal tone. Thus, in an example, the characteristics identification model 350 may infer that the requesting user uses a lot of formal jargon but avoids Latin and generally uses short sentences. As discussed above, some or all of these inferences may be made in advance or offline. For example, inferences about the user's writing style may be made offline such that when a query is received, that information is already available in a data store and does not need to be computed again. In such implementations, inferences that are associated with the context or the relevant to the query may be made in real time, while inferences that are general to the requesting user (or an intended recipient) are made offline.

In some examples, determinations are made with the specific context of the user query in mind. For example, when the user query 210 is for a draft email to a specific recipient, the user search query 310 runs a search for emails drafted for the requesting user to the specific recipient. The characteristics identification model 350 then receives these emails as an input and identifies the tone used by the requesting user when drafting emails to the recipient (e.g., formal, casual, positive, etc.). Thus, the characteristics identification model 350 receives user data about the requesting user as an input and provides output data that characterizes patterns about the user as an output. The output of the characteristics identification model 350 is provided to the pseudo-document generating engine 270. The characteristics identification model 350 may be a language model such as an LLM (e.g., a Transformer model)

The preference identification model 360 also receives data from the user communications 320, user documents 330 and user actions 340 to identify preferences for the requesting user. In some implementations, the preference identification model 360 is a language model such as an LLM (e.g., a Transformer model). To ensure efficiency, the preference identification model 360 receives user communications, user documents and/or user actions that were identified as search results of the user search query 310. In this manner, the preference identification model 360 makes inferences that are specifically related to the user query 210 instead of having to make inferences based on a large number of documents and/or data points. For example, the preference identification model 360 can determine based on the results of the user search query 310 that the requesting user likes fishing. This may be determined when the user search query 310 contains the term fishing and the resulting user communications, user documents, and/or user actions show a pattern or an indication that the user speaks positively about fishing.

While the characteristics identification model 350 and preference identification model 360 make inferences about the requesting user, the content identification engine 370 may simply identify content within the search results of the user communications 320 and user documents 330 and/or user actions 340 that relate to the user search query 310. For example, if the search results of the user communications 320 identify 10 emails related to the keywords in the user search query 310, the content identification engine 370 may identify the sentences within those emails that are specifically related to the user search query 310. In an example, if the user search query is for communications from the requesting user to a specific recipient about fishing, and the search results identify 10 emails that include the word fishing in them, the content identification engine 370 examines the 10 emails to identify the portions of the email that mention fishing and determines whether those portions are actually related to fishing. For example, an email with a sentence that states "he was fishing for information" may be identified as not being relevant, while a sentence in another email that states "I went fly fishing last weekend," is identified as being relevant for transmission to the pseudo-document generating engine 270. To perform this analysis, the content identification engine 370 may utilize one or more ML models such as NLP models. Thus, the content identification engine 370 examines the search results to identify specific portions of data (e.g., sentences, phrases, or other types of content) that is relevant to the requesting user and/or the user search query 310 and as such should be transmitted to the pseudo-document generating engine 270. The identified portions of data are then transmitted from the content identification engine 370 to the pseudo-document generating engine 270.

In addition to considering the requesting user's data, the authoring assistance system 110 also takes into account the context of the user query. The context may be a specified recipient, an intended result, an event and the like. For example, the context may be an upcoming meeting or a content portion for a sales pitch to a potential client. FIG. 3B depicts elements involved in processing a search query to identify data associated with the context of the search query. To ensure that the data identified as a result of the search is restricted to data associated with the context of the user query 210, context search query 310 may be generated by the search query generating engine 250 and used by the search engines 260 to perform searches on the context data 230. For example, for a user query submitted by user X that states "draft an email to Jennifer Smith about the monthly budget", the context search query 310 may include the terms email, monthly budget, and Jennifer Smith. Alternatively, different user search queries may be generated and used for different data sets. For example, when the data set that is being searched is the requesting user's emails, the user search query may specify that emails sent from user X to Jennifer Smith should be searched for the terms monthly budget. Thus, the search query generating engine 250 may determine which data sets to search based on the user query 210 and subsequently generate an appropriate search query for the selected data set for inclusion in the context search query 375 that is run against the selected data set. In some implementations, the search query is converted to embeddings that can then be compared to embeddings of the data sets searched to increase the searching efficiency. For example, one or more embedding vectors that are numeral in form may be computed from one or more portions of the textual user query to generate the search query 310.

When the context of the user query is a person (e.g., an intended recipient), then the searches that are conducted on the context data 230 are similar to the searches that are conducted on the user data 220, with the difference that this time the user that is searched for is the intended recipient. For example, the context communications 380 may be communications that are sent to and received from the intended recipient and only those communications are searched for the context search query 375. Similarly, context documents 390 are documents authored by, edited, accessed, reviewed or commented on by the intended recipient. It should be noted that only documents to which the requesting user has access and/or for which the requesting user has permission to use can be searched.

Context actions 395 may include a list of actions taken by the intended recipient to which the requesting user has access. For example, comments made by the intended recipient on posts that the requesting user can view, or comments made by the intended recipient on documents the requesting user has permission to access are included in the context actions 395. When the context is something other than an intended recipient, the context actions 395 may include a list of actions taken by other users. For example, when the context is an upcoming meeting, the context actions 395 may include actions taken by the meeting attendees in previous meetings or actions taken by meeting invitees on documents or communications to which the requesting user has access. Similarly, context communications for an upcoming meeting may be communications exchanged about the meeting to which the requesting user has access. Context documents 390 for an upcoming meeting may include documents associated with the meeting (e.g., documents that were attached to the meeting invitation).

The search results from the context communications 380, context documents 390 and context actions 395 are provided to the characteristics identification model 350, preference identification model 360 and/or content identification model 370 to identify characteristics of the intended recipient, preferences of the intended recipient as they related to the search query and/or specific content associated with the intended recipient as it relates to the search query. When the context is not a person, but is an event or a situation, the search results from the context communications 380, context documents 390 and context actions 395 are provided to the characteristics identification model 350, preference identification model 360 and/or content identification model 370 to identify characteristics of the contexts, preferences associated with the contexts (e.g., preferences of the meeting participants) and/or specific content associated with the context (e.g., content associated with the subject matter of the meeting). The characteristics identification model 350, preference identification model 360 and/or content identification model 370 operate in a similar manner as that discussed above to provide information relevant to the context to the pseudo-document generating engine 270.

The pseudo-document generating engine 270 of FIG. 3A utilizes the data provide by the characteristics identification model 350, preference identification model 360 and/or content identification model 370 to generate a pseudo-document that contains information about the requesting user. Similarly, the pseudo-document generating engine 270 of FIG. 3B utilizes the data provide by the characteristics identification model 350, preference identification model 360 and/or content identification model 370 to generate a pseudo-document that contains information about the context. Thus, in some implementations, the pseudo-document generating engine 270 generates at least two different pseudo-documents. In other implementations, the pseudo-document generating engine 270 collects the information generated about the requesting user and the context and generates one pseudo-document that contains data about both the requesting user and the context.

The pseudo-document may be a document containing text extracted from the data provided by the characteristics identification model 350, preference identification model 360 and/or content identification model 370. The term "pseudo-document" as used herein refers to a proxy for a document, which is a simplified version of a document. A pseudo-document often does not contain all fields of a document, but it does contain the content (e.g., text of the document). As a result, the pseudo-document can be accessed faster and does not need to be opened to access its contents. Thus, the pseudo-document represents a document that contains the data needed to generate a prompt for the language model. The one or two pseudo-documents represent the known context about the requesting user and/or the intended audience or context. The pseudo-document(s) are generally constructed dynamically and based on the user's query. For example, if the user asks the language model to generate a text about soccer for John Smith, the part of the pseudo-document that expresses the requesting user's knowledge about John Smith's opinions and preferences would focus on John Smith's opinions and preferences about soccer and related topics, and not necessarily about John Smith's other interests and preferences.

In some implementations, the pseudo-document generating engine 270 receives a number of data points (e.g., text segments) from each of the characteristics identification model 350, preference identification model 360 and/or content identification model 370 and selects a subset of the received data points to include in the pseudo-document. The selection may be based on a relevance metric transmitted along with the identified characteristics, identified preferences, and/or identified content. This may be achieved when each of the characteristics identification model 350, preference identification model 360 and/or content identification model 370 calculate relevance measurements for each of their outputs and provide the relevance metric to the pseudo-document generating engine 270. In some implementations, the characteristics identification model 350, preference identification model 360 and/or content identification model 370 themselves rank and select a subset of the identified data points before they transmit the data points to the pseudo-document generating engine 270.

The pseudo-document generating engine 270 may need to select a subset of the received data points because of size limitations of the prompt that can be provided to the language model, as further discussed below. As such, the pseudo-document may have size restrictions (e.g., no more than 200 words). Depending on the number of received data points, the pseudo-document generating engine 270 may select a top-ranked portion of the data points. In some implementations, the pseudo-document generating engine 270 simply adds the selected data points to the document. The resulting pseudo-document for the requesting user includes a collection of facts about the requesting user and/or as they relate to the requesting user and a subject matter of the user query. Similarly, the resulting pseudo-document for the context includes a collection of facts about the context and/or as they relate to the context and a subject matter of the user query. In some implementations, the pseudo-document has a specific data structure. For example, data about the user query may be positioned at the top in the pseudo-document, followed by data related to the requesting user and then data about the context. In some implementations, the data structure is application specific. An advantage of using a pseudo-document that has a specific structure is that all or part of a pseudo-document can be reused for various purposes. In other implementations, the data structure does not adhere to any established standards.

Referring back to FIG. 2, the two pseudo-documents are transmitted from the pseudo-document generating engine 270 to the prompt generating engine 280 to generate a prompt based on the user query 210, the requesting user and the context for the language model 130. In some implementations, the prompt generating engine 280 constructs a prompt in a manner that is likely to result in a relevant and/or accurate response from the language model 130. This may involve constructing the prompt in a manner that corresponds with the format and type of input accepted by the language model 130. In some implementations, the prompt generating engine 280 generates the prompt by integrating the content of the two pseudo-documents with the user query 210. As discussed above, the prompt may have size restrictions. As such, the prompt generating engine 280 may select a subset of the content of the two pseudo-documents for inclusion in the prompt. The prompt generating engine 280 generates the prompt based on knowledge about the types of prompts that result in accurate and/or relevant responses.

The generated prompt is provided as an input to the language 130. In response, the language 130 generates a response to the user query 210 that is relevant to the requesting user and the specified context. The output of the language model which is response to the user query 210 is provided to the application 120/164 for being presented to the user via a UI screen. In some implementations, the language model 130 transmits the response back to the authoring assistance system 110 which in turn transmits the response to the application 120/164 for display to the user.

Figure 4A:
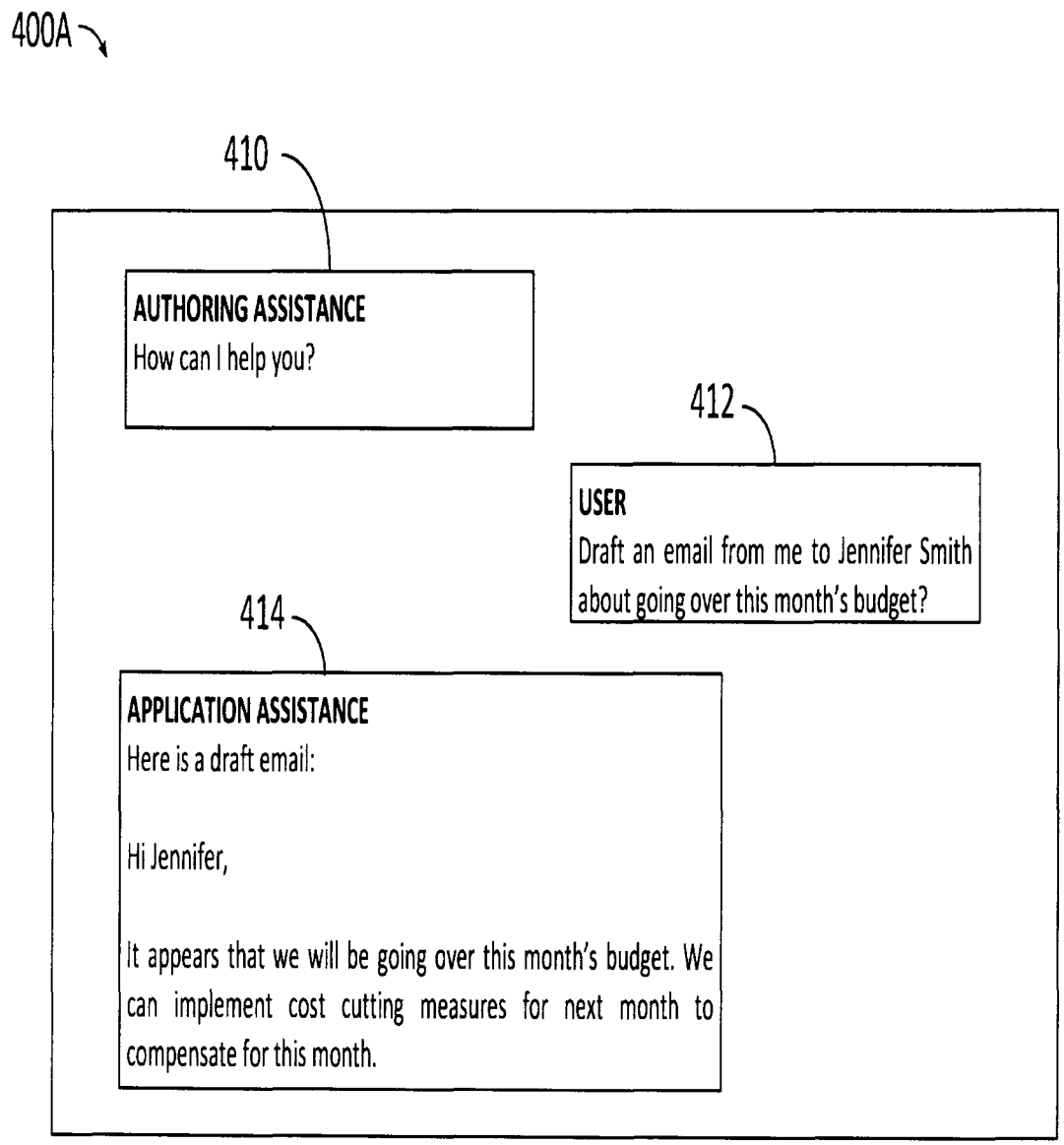
FIGS. 4A-4C depict example user interface (UI) screens of an application that utilizes a language model to provide context-aware authoring assistance.
Figure 4B:
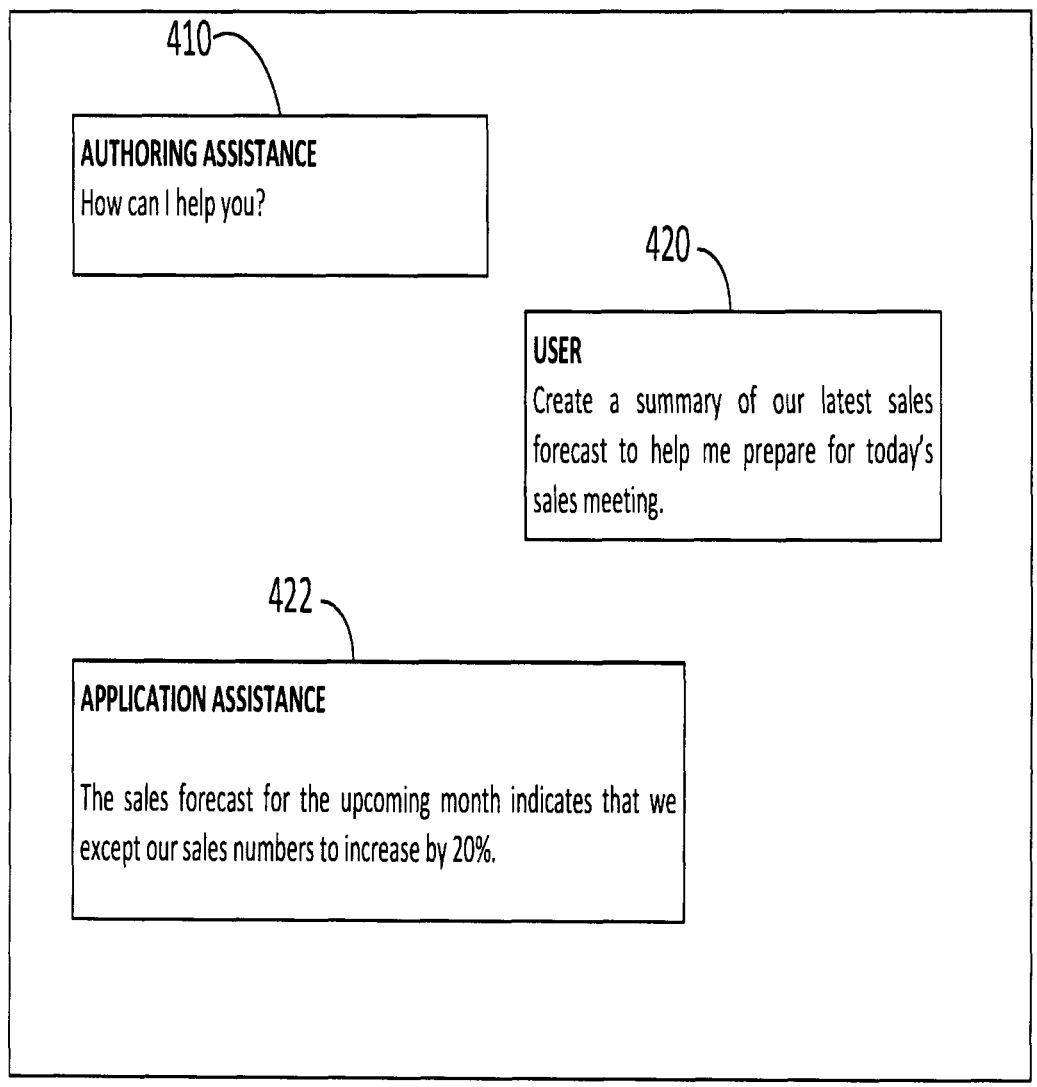
Figure 4C:
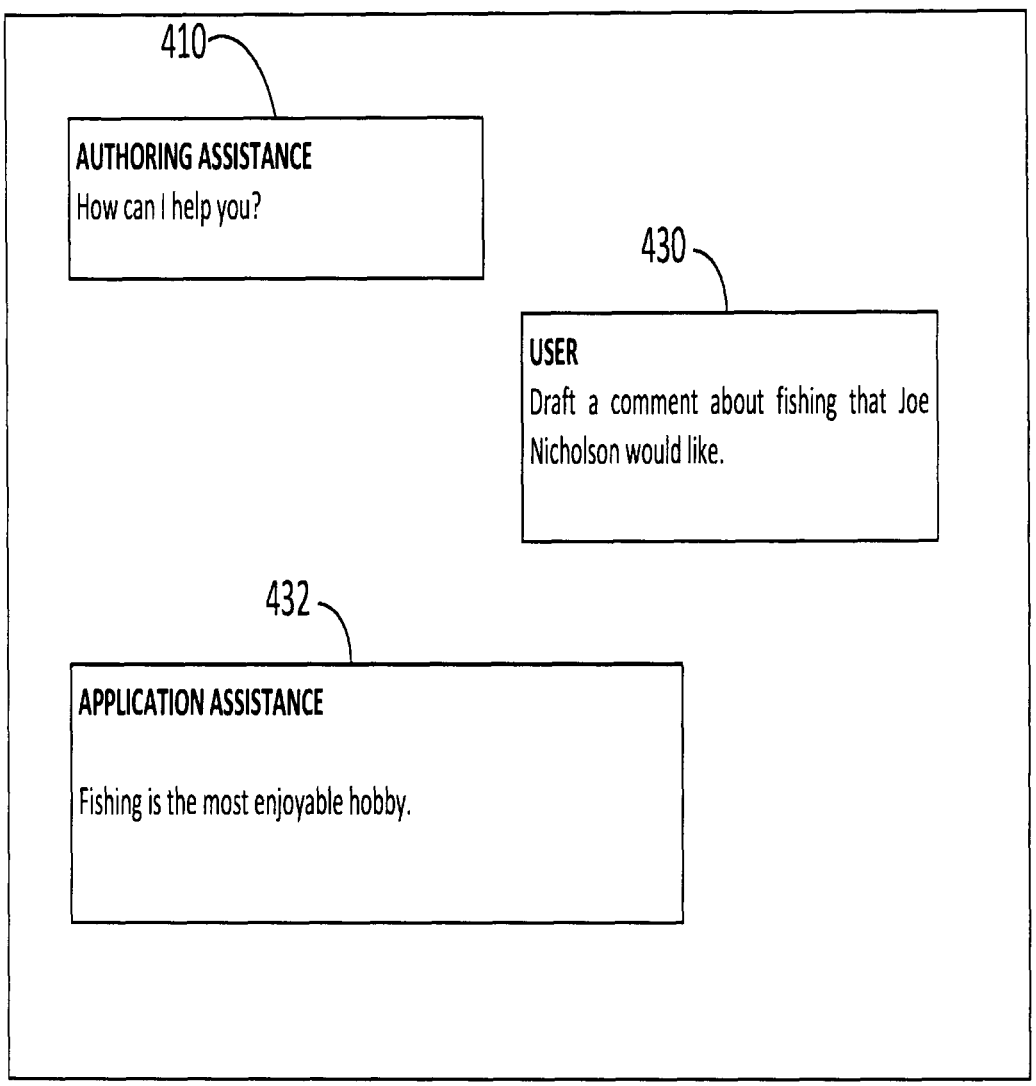

FIGS. 4A-4C depict example user interface (UI) screens of an application that utilizes a language model to provide context-aware authoring assistance. FIG. 4A depicts an example graphical user interface (GUI) screen 400A of an application that provides an assistant (e.g., a copilot) for authoring context-aware content. In an example, the assistant is provided for a communications application such as Microsoft Outlook. As depicted, the assistant may begin the conversation (e.g., when a user invokes the assistance) by displaying a UI element 410 that asks how it can help the user. The user can utilize a UI element 412 to enter a user query. In the example depicted in screen 400A, the user submits a request to the assistant to draft an email from the user to Jennifer Smith about going over this month's budget. In response, the assistant (e.g., language model) creates content that is customized based on both the requesting user, the topic provided by the user query and the receiving user (e.g., audience). The authoring assistance system is able to infer from a search of the user's documents related to this month's budget, that the company is going over this month's budget. The authoring assistance system also infers that Jennifer is financially conservative and/or she is interested in cost cutting measures. As a result, the authoring assistance system generates a prompt for the language model that takes these parameters into account to enable the language model to generate content based on these parameters. The resulting content is displayed in the UI element 414.

FIG. 4B depicts an alternative example of generating context-aware content. The GUI screen 400B displays an example where the user submits a request for creating a summary of the company's latest sales forecast to help the user prepare for today's sales meeting. The user submits this request via the UI element 420. In response, the authoring assistance system generates a prompt that takes the context of the meeting as well as the keywords latest sales forecast into account to prepare content that is relevant to the meeting (e.g., interesting for the meeting attendees) and is relevant to the requesting user. The prompt is transmitted to the language model which uses the prompt to generate the response displayed in UI element 422.

FIG. 4C depicts a GUI screen 400C which illustrates an example user query for drafting a comment about a specific topic that is tailored to a specific context (in this case the context being something that Joe Nicholson would like). The user query is provided in the UI element 430 and transmitted to an authoring assistance system for processing. In response, the authoring assistance system generates a prompt that takes the context of the receiving user, Joe Nicholson, as well as the keyword fishing into account to prepare content that the receiving user is likely to appreciate. The authoring assistance system conducts a search of the receiving user's data to identify items associated with fishing and infers from the collected data that the receiving user likes fishing. This information is included in the prompt transmitted to the language model to enable the prompt to customize the response based on the audience. The response generated by the language model is displayed in UI element 432.

Figure 5:
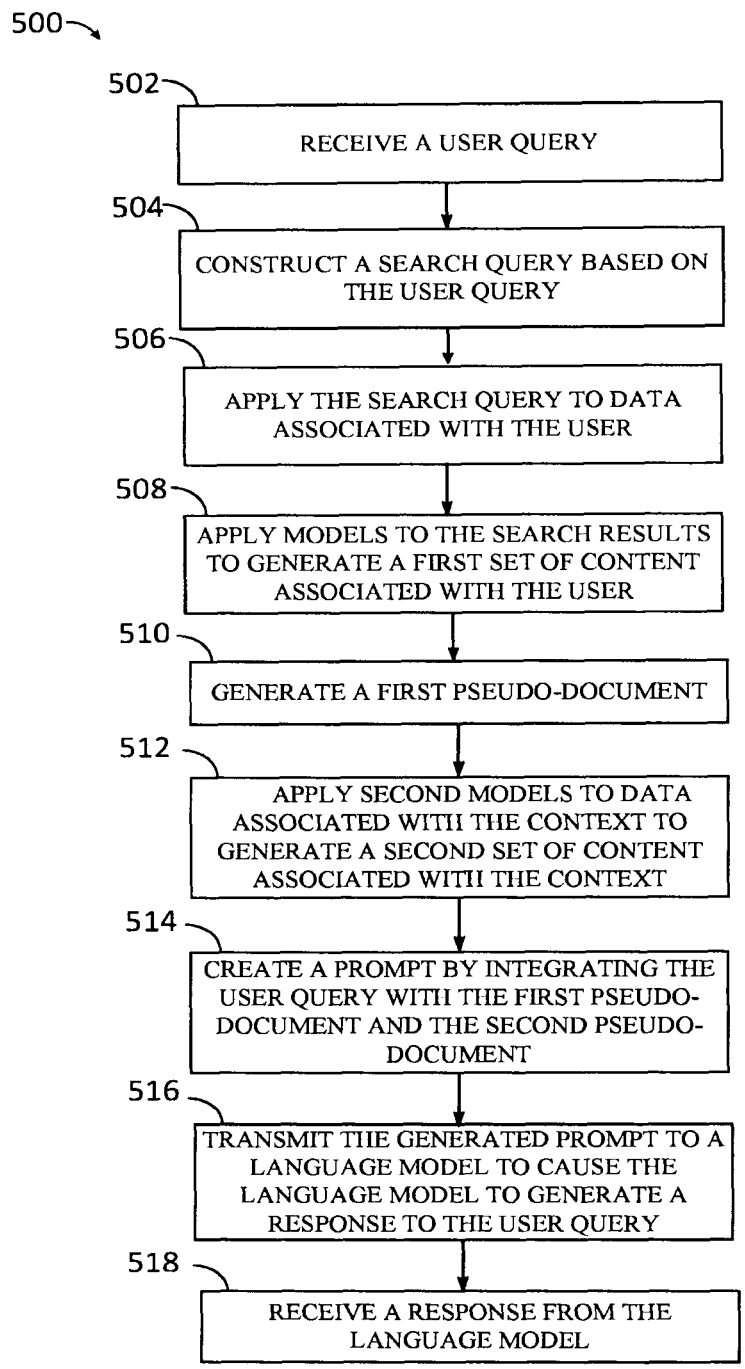
FIG. 5 is a flow diagram depicting an example method for providing context-aware authoring assistance.

FIG. 5 is a flow diagram depicting an exemplary method 500 for providing context-aware authoring assistance. One or more steps of method 500 may be performed by an authoring assistance system such as the authoring assistance system 110 of FIGS. 1-2 and/or by a language model such as the language model 130 of FIGS. 1-2. Method 500 beings by receiving a user query, at 502. The user query may be submitted by a user via a user interface element of an application and be received by the authoring assistance system. The user query includes one or more terms and a context. The context could be an intended recipient of content generated in response to the user query. Additionally, the context could be an event of specific situation for which the response should be generated. The application via which the user query is received may be a content generating application or a copilot for a content generating application that enables a user to generate content. The user query may be in a natural language format and may be received in text, audio or other formats. In some implementations, the application or copilot transmits the user query to the authoring assistance system for processing or the authoring assistance system may retrieve the user query via, for example, an API call.

After receiving the user query, method 500 proceeds to construct a search query based on the user query, at 504. In some implementations, this involves a search query generating engine that constructs two queries, one for searching for content associated with the requesting user and one for searching for content associated with the context. After the search query is generated, method 500 applies the search query to data associated with the user to generate search results associated with the user, at 508. The data on which the search query is conducted may include user communications, user documents and user actions.

Once the search results are generated, one or more models are applied to the search results associated with the user to conduct analysis of the data associated with the user and to generate a first set of content associated with the user, at 508. This may involve utilizing multiple models to infer characteristics and preferences of the user. Additionally, a content identification engine may be used to identify content associated with the user. The generated set of content and/or identified content is used to generate a first pseudo-document, at 510. In some implementations, the search query is also applied to data associated with the context to generate search results associated with the context. One or more models are then applied to the search results associated with the context or to the data associated with the context to generate a second set of content associated with the context, at 512. In some implementations, the content identification engine is also used to identify content associated with the context. The generated second set of content and/or identified content associated with the context is then used to generate a second pseudo-document, at 512. The first pseudo-document includes at least a portion of the first set of content generated by the one or more models and the second pseudo-document includes at least a portion of the second set of content generated by the one or more models.

After generating the first and second pseudo-documents, method 500 generates a prompt by integrating the user query with the first pseudo-document and the second pseudo-document, at 514. The prompt is then transmitted to a language model to cause the language model to generate a response to the user query that is customized to both the user and the context, at 516. Prompt generation may be performed by a prompt generation engine. This involves generating a prompt that includes the user query received from the user and at least a portion of the first and the second pseudo-documents.

Once the prompt is transmitted to the model, a response is received from the language model, at 518. The response is a content generated by the language model based on the user query but that is customized for the requesting user and based on the context provided in the user query. The response may then be transmitted to the application from which the user query was received for display to the user.

Figure 6:
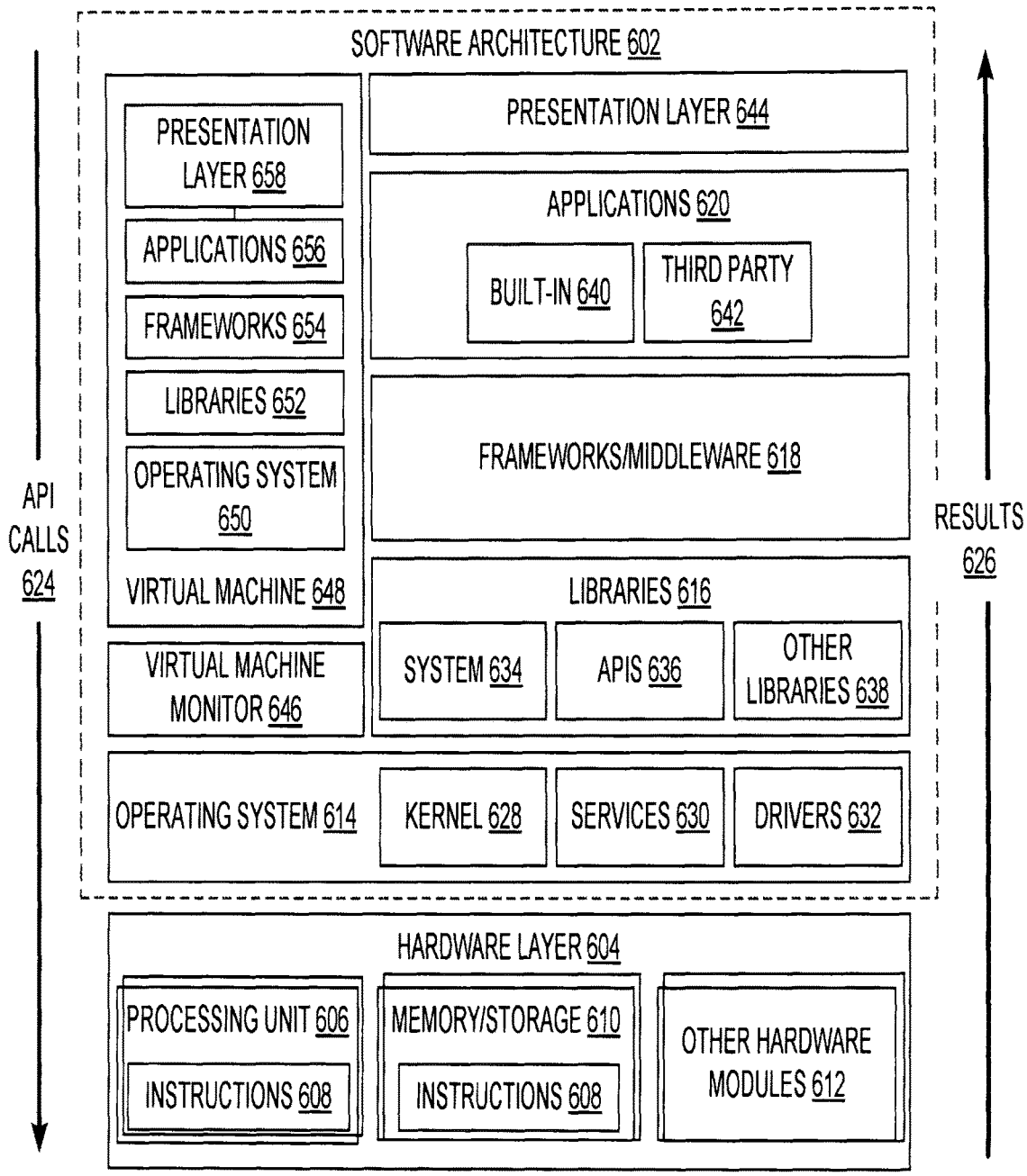
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
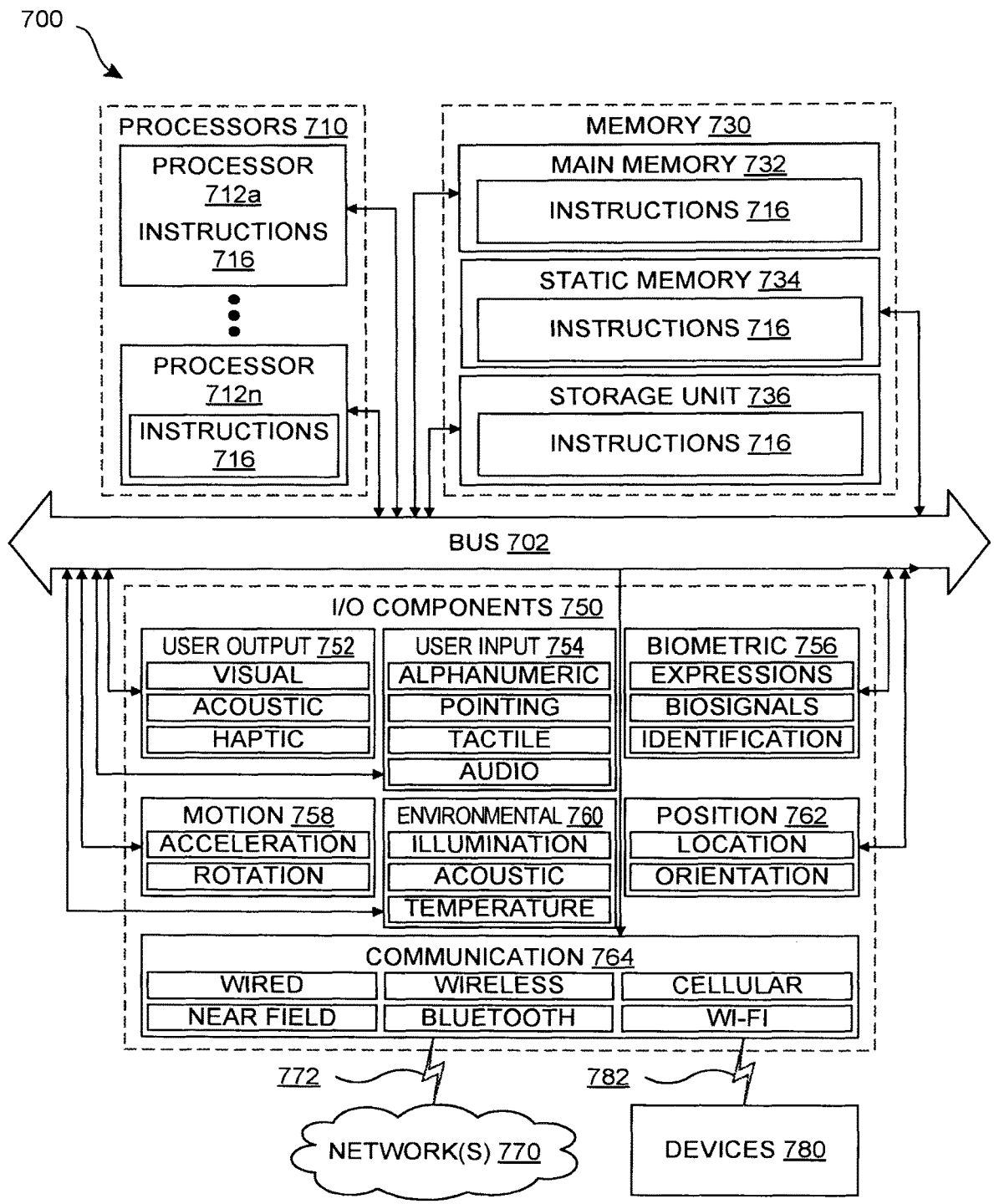
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764 such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor alone or in combination with other processors, cause the data processing system to perform functions of:
receiving a user query submitted by a user via a user interface element of an application, the user query including a context;
constructing a search query based on the user query;
applying the search query to data associated with the user to generate first search results associated with the user;
applying one or more first models to the first search results to conduct analysis of the data associated with the user and to generate a first set of content associated with the user;
generating a first pseudo-document by including at least a portion of the first set of content generated by the one or more first models;
applying one or more second models to data associated with the context to conduct analysis of the data associated with the context and to generate a second set of content associated with the context;
generating a second pseudo-document by including at least a portion of the second set of content generated by the one or more second models;
creating a prompt, using a prompt generating engine, by integrating the user query with the first pseudo-document and the second pseudo-document; and
transmitting the generated prompt to a language model to cause the language model to generate a response to the user query that is customized to both the user and the context.

Item 2. The data processing system of item 1, wherein the instructions when executed by the processor alone or in combination with other processors, cause the data processing system to perform functions of:
constructing a context search query based on the user query;

applying the context search query to data associated with the context to generate second search results associated with the context,
wherein applying the one or more second models to the data associated with the context to conduct analysis of the data associated with the context and generate a set of content associated with the context includes applying the one or more second models to the second search results.

Item 3. The data processing system of any of items 1 or 2, wherein the data associated with the user includes at least one of a history of communications associated with the user, user documents associated with the user and user actions associated with the user.

Item 4. The data processing system of item 3, wherein the history of communications associated with the user includes communications sent or received by the user.

Item 5. The data processing system of item 3, wherein user documents associated with the user include at least one of documents authored, accessed, edited or stored by the user.

Item 6. The data processing system of item 3, wherein the user actions include one or more actions taken by the user in one or more applications.

Item 7. The data processing system of any preceding item, wherein the search query is constructed such that the first search results are associated with the user and the user query.

Item 8. The data processing system of any preceding item, wherein the context is an intended recipient of the response.

Item 9. The data processing system of any preceding item, wherein the user query is a request for authoring assistance.

Item 10. The data processing system of any preceding item, wherein the one or more first models include a characteristics identification and a preference identification model.

Item 11. A method for automatically generating content for a user based on a context comprising:
  conducting a search of data associated with the user to generate first search results associated with the user;
  applying one or more first models to the first search results to infer first patterns associated with the user and to generate a first set of content based on the inferred patterns;
  generating a first pseudo-document that includes a first set of pattern content, based on the first set of content generated by the one or more first models;
  applying one or more second models to data associated with the context to infer second patterns associated with the context and to generate a second set of content based on the second inferred patterns;
  generating a second pseudo-document based on the second set of content generated by the one or more second models;
  creating a prompt, using a prompt generating engine, by integrating the first pseudo-document and the second pseudo-document; and
  transmitting the generated prompt to a language model to cause the language model to generate the content for the user, the content being customized to both the user and the context.

Item 12. The method of item 11, wherein the context is an intended recipient of the content.

Item 13. The method of any of items 11 or 12, wherein the inferred second patterns include one or more preferences of the intended recipient.

Item 14. The method of any of items 11-13, further the context is an event.

Item 15. The method of any of items 11-14, further comprising:
  conducting a search of data associated with the context to generate second search results associated with the context,
  wherein, applying the one or more second models to data associated with the context to infer the second patterns associated with the context includes applying the one or more second models to second search results associated with the context.

Item 16. A non-transitory computer readable medium on which are stored instructions that, when executed, cause a programmable device to perform functions of:
  processing a user query submitted by a user, the user query including one or more terms and a context;
  constructing a search query based on the one or more terms and at least one of the user and the context;
  applying the search query to at least one of data associated with the user and data associated with the context to generate search results associated with the one or more terms and at least one of the user and the context;
  providing search results associated with the one or more terms and the user to one or more first models to generate a first set of content associated with the user;
  receiving the first set of content from the one or more first models;
  providing search results associated with the one or more terms and the context to one or more second models to generate a second set of content associated with the context;
  receiving the second set of content from the one or more second models;
  automatically extracting data from the first set of content associated with the user and the second set of content associated with the context to generate a pseudo-document;
  creating a prompt, using a prompt generating engine, by integrating the user query with the pseudo-document; and
  transmitting the generated prompt to a language model to cause the language model to generate a response to the user query that is customized to both the user and the context.

Item 17. The non-transitory computer readable medium of item 16, wherein the context is an intended recipient.

Item 18. The non-transitory computer readable medium of items 16 or 17, wherein the language model is a large language model.

Item 19. The non-transitory computer readable medium of any of items 16-18, wherein the instructions when executed, further cause the programmable device to perform functions of applying a content identification engine to the search results to identify content associated with the user, wherein the pseudo-document is generated based on the first set of content generated by the one or more first models and the identified content.

Item 20. The non-transitory computer readable medium of any of items 16-19, wherein the instructions when executed, further cause the programmable device to perform functions of applying a content identification engine to the search results to identify content associated with the context, wherein the pseudo-document is generated based on the second set of content generated by the one or more second models and the identified content In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor alone or in combination with other processors, cause the data processing system to perform functions of:
   receiving a user query submitted by a user via a user interface element of an application, the user query including a context;
   constructing a search query based on the user query;
   applying the search query to first data associated with the user to generate first search results associated with the user;
   applying one or more first models to the first search results to conduct a first analysis of the first data associated with the user and to generate a first set of content associated with the user;
   generating a first pseudo-document by including at least a first portion of the first set of content generated by the one or more first models;
   applying one or more second models to second data associated with the context to conduct a second analysis of the second data associated with the context and to generate a second set of content associated with the context;
   generating a second pseudo-document by including at least a second portion of the second set of content generated by the one or more second models;
   creating a prompt, using a prompt generating engine, by integrating the user query with the first pseudo-document and the second pseudo-document; and
   transmitting the prompt to a language model to cause the language model to generate a response to the user query that is customized to both the user and the context.

2. The data processing system of claim 1, wherein the instructions when executed by the processor alone or in combination with other processors, cause the data processing system to perform functions of:
   constructing a context search query based on the user query;
   applying the context search query to the second data associated with the context to generate second search results associated with the context,
   wherein applying the one or more second models to the second data associated with the context to conduct analysis of the data associated with the context and generate a set of content associated with the context includes applying the one or more second models to the second search results.

3. The data processing system of claim 1, wherein the first data associated with the user includes at least one of a history of communications associated with the user, user documents associated with the user and user actions associated with the user.

4. The data processing system of claim 3, wherein the history of the communications associated with the user includes the communications sent or received by the user.

5. The data processing system of claim 3, wherein the user documents associated with the user include at least one of documents authored, accessed, edited or stored by the user.

6. The data processing system of claim 3, wherein the user actions include one or more actions taken by the user in one or more applications.

7. The data processing system of claim 1, wherein the search query is constructed such that the first search results are associated with the user and the user query.

8. The data processing system of claim 1, wherein the context includes an intended recipient of the response.

9. The data processing system of claim 1, wherein the user query includes a request for authoring assistance.

10. The data processing system of claim 1, wherein the one or more first models include a characteristics identification model and a preference identification model.

11. A method for automatically generating content for a user based on a context comprising:
   conducting a first search of first data associated with the user to generate first search results associated with the user;
   applying one or more first models to the first search results to infer first patterns associated with the user and to generate a first set of content based on the first patterns;
   generating a first pseudo-document that includes a first set of pattern content, based on the first set of content generated by the one or more first models;
   applying one or more second models to second data associated with the context to infer second patterns associated with the context and to generate a second set of content based on the second patterns;
   generating a second pseudo-document based on the second set of content generated by the one or more second models;
   creating a prompt, using a prompt generating engine, by integrating the first pseudo-document and the second pseudo-document; and
   transmitting the prompt to a language model to cause the language model to generate the content for the user, the content being customized to both the user and the context.

12. The method of claim 11, wherein the context includes an intended recipient of the content.

13. The method of claim 11, wherein the second patterns include one or more preferences of an intended recipient.

14. The method of claim 11, wherein the context includes an event.

15. The method of claim 11, further comprising:
   conducting a second search of the second data associated with the context to generate second search results associated with the context,
   wherein, applying the one or more second models to the second data associated with the context to infer the second patterns associated with the context includes applying the one or more second models to the second search results associated with the context.

16. A non-transitory computer readable medium on which are stored instructions that, when executed, cause a programmable device to perform functions of:
   processing a user query submitted by a user, the user query including one or more terms and a context;
   constructing a search query based on the one or more terms and at least one of the user and the context;
   applying the search query to at least one of first data associated with the user and second data associated with the context to generate search results associated with the one or more terms and at least one of the user and the context;
   providing first search results associated with the one or more terms and the user to one or more first models to generate a first set of content associated with the user;
   receiving the first set of content from the one or more first models;
   providing second search results associated with the one or more terms and the context to one or more second models to generate a second set of content associated with the context;
   receiving the second set of content from the one or more second models;
   automatically extracting data from the first set of content associated with the user and the second set of content associated with the context to generate a pseudo-document;
   creating a prompt, using a prompt generating engine, by integrating the user query with the pseudo-document; and
   transmitting the prompt to a language model to cause the language model to generate a response to the user query that is customized to both the user and the context.

17. The non-transitory computer readable medium of claim 16, wherein the context includes an intended recipient.

18. The non-transitory computer readable medium of claim 16, wherein the language model includes a large language model.

19. The non-transitory computer readable medium of claim 16, wherein the instructions when executed, further cause the programmable device to perform functions of applying a content identification engine to the first search results to identify content associated with the user, wherein the pseudo-document is generated based on the first set of content generated by the one or more first models and the content.

20. The non-transitory computer readable medium of claim 16, wherein the instructions when executed, further cause the programmable device to perform functions of applying a content identification engine to the second search results to identify content associated with the context, wherein the pseudo-document is generated based on the second set of content generated by the one or more second models and the content.

* * * * *